S. A. DUTTON.
STEERING MECHANISM.
APPLICATION FILED JUNE 28, 1921.

1,432,237.  Patented Oct. 17, 1922.

Inventor
Stephen A. Dutton.
By
Donald L. Maxson.
Attorney

Patented Oct. 17, 1922.

1,432,237

UNITED STATES PATENT OFFICE.

STEPHEN A. DUTTON, OF PHILADELPHIA, PENNSYLVANIA.

STEERING MECHANISM.

Application filed June 28, 1921. Serial No. 480,984.

*To all whom it may concern:*

Be it known that I, STEPHEN A. DUTTON, a citizen of the United States, residing at Philadelphia, in the county of Philadelphia and State of Pennsylvania, have invented certain new and useful Improvements in Steering Mechanism, of which the following is a specification.

This invention relates to improvements in steering mechanisms for vehicles, and more especially as applied to motor vehicles.

An object of the invention is to provide a suitable steering mechanism for motor vehicles, which may be operated equally well from any one of several positions at the front of the vehicle.

A further object is to provide a steering mechanism which employs the use of gear segments integrally formed with the stub axles or spindles, and cooperating means for operating the same in unison.

Another object is to provide a suitable steering mechanism for vehicles, more especially motor vehicles, which will be efficient in use, and inexpensive to manufacture.

Other objects will appear as the description proceeds.

Figure 1:
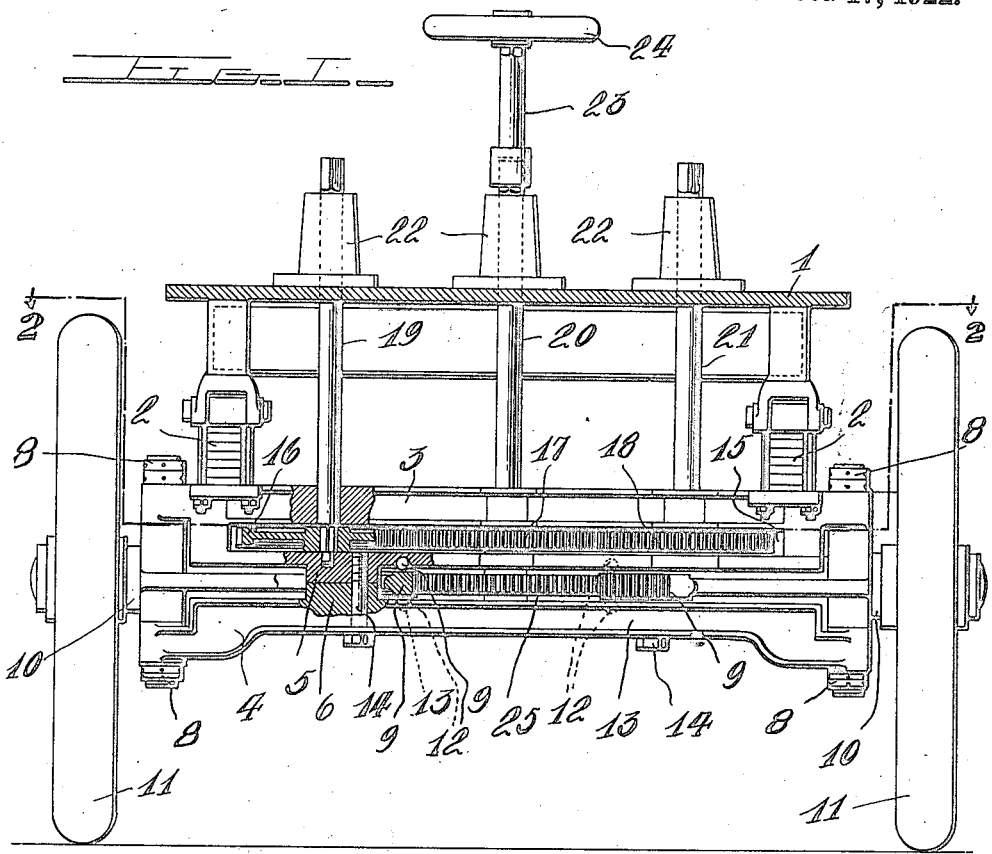
Figure 2:
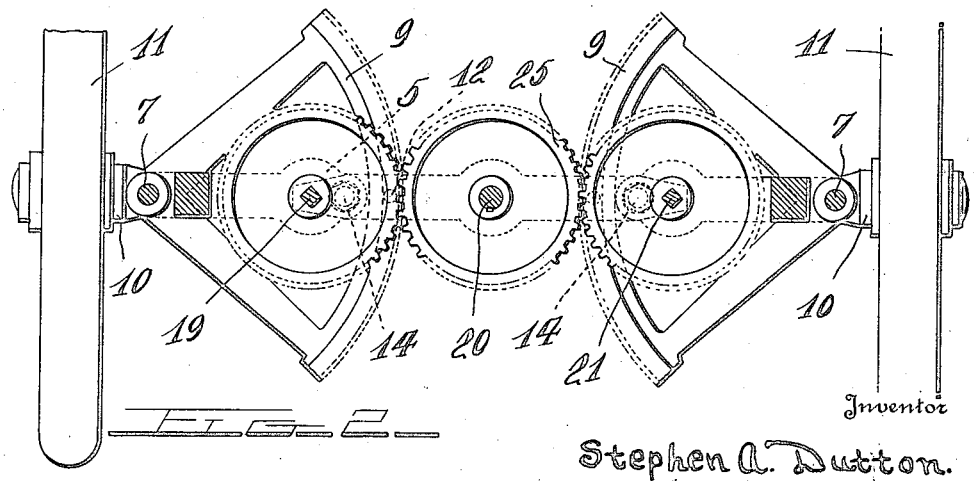

In the accompanying drawings which constitute a part of this application,

Figure 1 is a front elevation, partly in section, of my improved steering mechanism as applied to a vehicle, and Figure 2 is a section taken on the line 2—2 of Figure 1.

Like characters of reference are used throughout the following specification, to designate corresponding parts.

The vehicle body 1 is supported by means of the usual springs 2, connected to the chassis.

The front axle is divided into two sections or beams 3 and 4, which represent the upper and lower sections respectively. These axle sections 3 and 4 are provided with the lugs 5 and 6 respectively, which are in contact one with the other, when the axle beams are in position on the spindles 7. The spindles 7 are mounted in the ball or roller bearings 8, which are positioned both at the upper and lower ends of the said spindles.

The gear segments 9 are rotatably pivoted on the spindles 7, and have the stub axles 10 formed integrally therewith, so that when the gear segments are turned, the stub axles will also be turned, thereby moving the wheels 11.

The ball bearings 12 are fitted in the recesses 13 in the axle sections 3 and 4, and engage the upper and lower surfaces of the outer periphery of the gear segments 9, and act as bearings for the same. The bolts 14 pass up through the axle sections and lugs to hold them in fixed position. As illustrated in the drawing, the axle sections are spaced, so that the gear segments may be positioned and operate between them.

The upper axle section 3 is provided with a recessed space or slot 15, into which are placed the intermeshing gear wheels 16, 17 and 18, which are carried by the vertically mounted steering or operating rods 19, 20 and 21, respectively. These steering rods pass up through the upper axle section 3, and through the vehicle body 1, through the bearing collars 22. On the ends of these steering rods are formed the square head portions which are adapted to receive and firmly engage the detachable steering arm 23, to which is attached the steering wheel 24. It will be seen that this steering arm and wheel may be attached to either of the three steering rods at will. This provides for the more ready steering of the vehicle, should the load it carries extend out to and over either side of the front of the body 1.

The steering rod 20 is made longer than the other two rods 19 and 21, and carries at its lower end the gear wheel 25, which is positioned on the same plane with the gear segments and is in mesh with the same.

From the foregoing description, it will be seen that the steering wheel may be placed on any one of the steering rods desired, and since the three gear wheels 16, 17 and 18 are in mesh, the gear segments will be caused to rotate equally as well when any one of the steering rods are rotated.

The lugs 5 and 6 are so positioned with respect to the gear segments, that said segments may be rotated just so far, when their movement is stopped or limited. This prevents the gear segments from becoming disengaged from the gear wheel 25, thereby making the steering mechanism always positive in operation.

Many minor changes in detail of construction may be resorted to without departure from the spirit of the invention.

Having thus described my invention what I claim as new and desire to secure by Letters Patent of the United States is:—

1. In a steering mechanism, the combination of a spaced composite front axle, spindle bolts connecting the ends of said axle, gear segments carried by said spindle bolts, stub axles formed integrally with said segments, means for limiting the travel of said segments, one of said axle members being provided with a recessed portion, a plurality of steering rods, gear wheels positioned within said recessed portion of the axle and carried by said rods, and means connecting said gear wheels with said gear segments, whereby either one of said steering rods may be employed equally well for steering.

2. In a steering mechanism, the combination of a spaced composite front axle, spindle bolts connecting the ends of said axle, means for holding said axle in operative position, gear segments carried by said bolts, stub axles formed on said segments, wheels on said stub axles, means formed on said axle members for limiting the movement of said gear segments, ball bearings for said segments, a central steering rod, steering rods at either side thereof, gear wheels carried by said rods, and means carried by said central rod for connecting said gear segments, whereby any one of said steering rods may be used equally well for steering.

3. In a steering mechanism, the combination of a spaced composite front axle, spindle bolts connecting the ends of said axle, gear segments rotatably mounted on said bolts, stub axles formed at the apices of said gear segments, a plurality of steering rods extending upwardly to form free squared ends, gearing connecting said rods with said gear segments, means for limiting the movement of said segments, and a detachable steering wheel adapted to engage any one of said square ends.

In testimony whereof I affix my signature.

STEPHEN A. DUTTON.